Patented Sept. 13, 1932

1,877,163

UNITED STATES PATENT OFFICE

LUDWIG DÜRR, OF FRIEDRICHSHAFEN, GERMANY, ASSIGNOR TO LUFTSCHIFFBAU ZEPPELIN G. M. B. H., OF FRIEDRICHSHAFEN, BODENSEE, GERMANY

METHOD OF SUPPLYING FUEL TO INTERNAL COMBUSTION ENGINES

No Drawing. Application filed October 29, 1928, Serial No. 315,679½, and in Germany November 28, 1927.

My invention relates to methods of supplying fuel to the engines of all kinds of motor driven vehicles, such as cars, locomotives, boats or ships, aeroplanes and airships; but it has special reference to the fuel supply of aircraft, Usually the motors of such vehicles are driven by liquid fuel, gasoline, benzol and also heavy hydro carbons are used as fuel for such motors. Stationary motors have been supplied with gaseous fuel also.

Lately it has been suggested to drive the motors of aircraft, especially those of lighter than air airships, by gaseous fuel. To store this fuel gas it is necessary to provide for wide and large spaces in the aircraft. There are no difficulties in this respect with airships.

With regard to heat efficiency it is more advantageous to use gaseous fuels in motors than to burn liquid ones.

It is an object of this invention to make this advantage available for all kinds of motor vehicles. For this purpose the gaseous fuel of high heat efficiency, according to my invention, is cooled down or even liquefied so that it may be transported in comparatively small containers. Of course, these tanks cannot be closed entirely because this would result in an extreme pressure on the walls of the containers so that they would have to be of very strong material and therefore extraordinarily heavy. They have to be always open to avoid such pressure and make it possible to use light material for their construction. A small portion of the cooled down liquefied fuel gas will always escape into the open air in the form of vapour. But the main quantity can be made use of in the engine for which purpose it will again expand and be mixed with air before entering the motor cylinder.

Thus it will for example be possible to store in the weight of one kilogram of fuel the amount of 16,000 heat units as compared with only 11,000 heat units per kilogram when using gasoline. Consequently the same fuel weight will have a much higher efficiency when gaseous fuel in cooled down and liquefied state is used, according to this invention, than when making use of the ordinary liquid fuel. This means an increase in the radius of action of the vehicle, which carries cooled down and liquefied gaseous fuel for its motor, which will be especially important with airplanes, that is aircraft heavier than air.

I claim:

1. The method of handling fuel on aircraft which consists of enclosing a liquefied fuel, gaseous at normal temperatures and pressures, in a light-weight, thin-walled vessel, bleeding off a sufficient amount of the vapor from the liquid so that the pressure inside the vessel will be substantially that of the atmosphere and feeding the fuel to the motor of the aircraft.

2. The method of handling fuel on aircraft which consists of enclosing a liquefied fuel, gaseous at normal temperatures and pressures, in a light-weight, thin-walled vessel, bleeding off a sufficient amount of the vapor from the liquid so that the pressure inside the vessel will be substantially that of the atmosphere and feeding liquid fuel to the place where it is to be consumed, said fuel being drawn from the body of liquid fuel in the vessel.

LUDWIG DÜRR.